March 11, 1969     J. C. ST. CLAIR     3,432,742
ROTARY SWITCH WITH NaOH SOLUTION BETWEEN ROTOR AND STATOR
Filed May 2, 1967
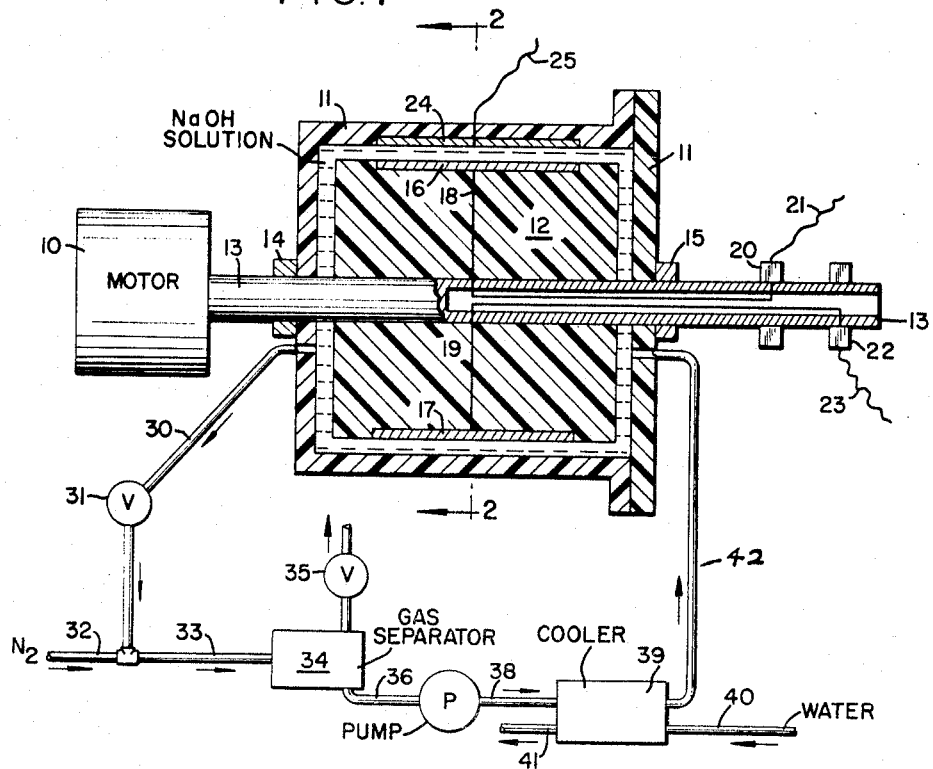
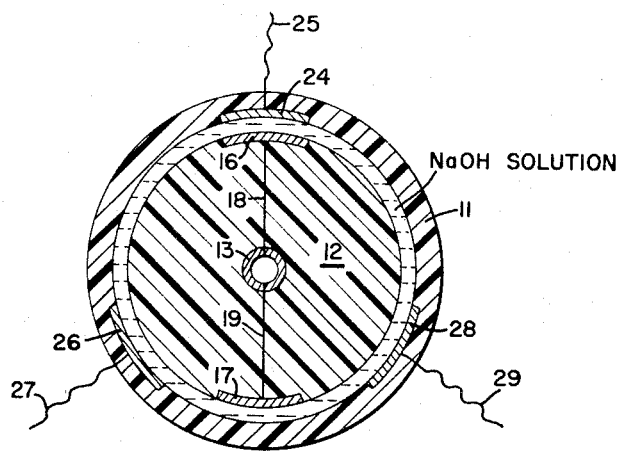
INVENTOR
John C. St. Clair

United States Patent Office 3,432,742
Patented Mar. 11, 1969

3,432,742
ROTARY SWITCH WITH NaOH SOLUTION BETWEEN ROTOR AND STATOR
John C. St. Clair, Box 333, Rural Rte. 2, London, Ohio 43140
Filed May 2, 1967, Ser. No. 635,504
U.S. Cl. 321—50     3 Claims
Int. Cl. H02m 7/34, 7/60, 7/92

ABSTRACT OF THE DISCLOSURE

A switch, for converting direct current to alternating current, which has a stationary outer hollow cylindrical shell, with electrodes on its inner surface, and a rotating cylindrical inner rotor with electrodes on its outer surface. The rotor is 0.2 inch less in diameter than the outer shell and is inside the outer shell. Between the rotor and the outer shell is passed a water solution of sodium hydroxide under sufficient pressure to completely dissolve the gases produced by electrolysis. As the rotor rotates, its electrodes alternately approach and draw away from the electrodes on the outer shell which produces the periodic effect of opening and closing switches.

---

The big purpose of this invention is to provide a cheap way to convert the direct current electricity produced by magnetohydrodynamic power plants into the alternating current that is desired for distribution by electric power companies. Magnetohydrodynamics is the method of converting heat directly into electricity by the passing of an electrically conductive fluid through a magnetic field. Magnetohydrodynamics is a very simple way for converting heat into electricity and has been the subject of much research by others during the last ten years. However it has the big drawback that all the preferred forms of it produce direct current.

In my invention I use, as a switch to periodically turn on and cut off the flow of an electrical current, the movement together and the movement apart of electrodes in an electrically conducting water solution. To make such a procedure practical the electrodes must be able to operate at high rates of current. I have found that this is possible by circulating the electrically conductive water solution with such a rate and under such a pressure that the hydrogen and oxygen produced by electrolysis are dissolved in the water solution and are removed from the switch before they can interfere with the passage of the electrical current between the electrodes.

FIG. 1 of the drawing is a vertical cross sectional view taken lengthwise of one form of my invention.

FIG. 2 is a vertical cross section on the line 2—2 of FIG. 1.

Referring to FIG. 1 there is an outer stationary cylindrical vessel or stator at 11. The stator 11 is made out of any convenient insulating material such as plastic. I prefer polystyrene. For higher pressures in the stator the polystyrene is provided with reinforcing. On the inside surface of stator 11 there are shown in FIG. 2 three electrodes 26, 24 and 28. These electrodes are provided with wires 27, 25 and 29 respectively to carry electricity to or from the switch. The electrodes are made of platinum plated on some cheap metal like nickel.

Inside stator 11 there is shown the rotor 12. The rotor 12 is made of any convenient insulating material such as plastic. I prefer polystyrene. The rotor 12 is mounted on shaft 13 which rotates on bearings and stuffing boxes 14 and 15. The shaft 13 and rotor 12 are rotated by motor 10. On the outer surface of rotor 12 there is electrode 16. This electrode is made of platinum plated on same cheap metal like nickel. Electricity is taken from electrode 16 by wire 18 which conducts the electricity to or from brush 20 which transmits the electricity to wire 21 which supplies direct current to the switch.

On the outer surface of rotor 12 is also electrode 17. This electrode is made of platinum plated on some cheap metal like nickel. Electricity is taken from electrode 17 by wire 19 which conducts the electricity to or from brush 22 which transmits the electricity to wire 23 which supplies the direct current to the switch.

Between stator 11 and rotor 12 there is maintained a solution of some substance in water that makes the water conductive. A great number of substances when dissolved in water will make water conductive to electricity. I prefer to use bases, as the substances, which are defined as hydroxyl compounds of metals. Examples are potassium hydroxide, lithium hydroxide, rubidium hydroxide, cesium hydroxide and sodium hydroxide. However I prefer most of all to use sodium hydroxide.

When rotor 12 rotates so that an electrode mounted on rotor 12 is opposite to an electrode mounted on stator 11, current can flow through the conductive solution between the electrodes and there is the effect of closing a switch. An example of this is electrodes 16 and 24 in the drawings. However when rotor 12 rotates so that two electrodes are separated, as for example electrodes 26 and electrode 17 in the drawing, current can only flow through a high resistance between the two electrodes and the effect is that of the opening of a switch.

An important feature is the cooling of the conductive water solution and the removal of dissolved gases from the solution. The water solution, which in this case is a NaOH solution, is removed from between the stator 11 and the rotor 12 by pipe line 30 and passes through valve 31 which reduces the pressure on the liquid to atmospheric. This will cause hydrogen and oxygen dissolved in the NaOH solution to evaporate off. As long as this mixture of gases is intimately mixed with the NaOH solution as it will be in a very high velocity pipe line the cooling effect of the NaOH solution will keep the gases from exploding. Therefore, before the oxygen and the hydrogen are separated from the liquid, nitrogen gas is added by pipe line 32 to the mixture to make the combined gases nonexplosive. The gases and liquid pass by pipe line 33 into gas separator 34 which separates off the gases and removes them from the system by valved pipe line 35. The NaOH solution passes by pipe line 36 to pump P which elevates the pressure on the NaOH solution. The solution flows through pipe line 38 to cooler 39 which cools the NaOH solution by water entering by pipe line 40 and leaving by pipe line 41. The degassed and cooled NaOH solution passes by pipe line 42 back to between stator 11 and rotor 12 to be used again.

To illustrate the mode of operation I shall assume that it is desired to make three phase 60 cycle, Y alternating current from direct current. One wire of the direct current will be wire 21 and the other wire of the direct current will be wire 23. The motor 10 will rotate at 60 revolutions per second. Therefore wire 21 will supply direct current of one polarity to electrode 16 which will supply current of this polarity to electrodes 24, 26 and 28 as electrode 16 rotates past them. This will supply electricity of the given polarity to wires 25, 27 and 29 sixty times per second.

Similarly wire 23 will supply direct current of the other polarity to electrode 17 which will supply current of this other polarity to electrodes 28, 24 and 26 as electrode 17 rotates past them. This will supply electricity of this other given polarity to wires 29, 25 and 26 sixty times per second. As a result the desired alternating current is produced.

Various obvious details have been omitted. These include supports for the motor 10 and the stator 11. Capacitors are also not shown.

The pressure of the electrically conducting solution when it is between the stator 11 and the rotor 10 will depend on the amount of solution that is circulated through my switch. I usually prefer to have the solution only 10% saturated with hydrogen when it leaves the switch for degassing. This will make the solution only 3% saturated with oxygen. Of course it is possible to operate with a much higher saturation of hydrogen but this does not allow for possible overloads on the switch and operating with a large safety factor does not raise the cost of my switch very much.

In designing one of my switches, the solubilities of hydrogen in a large number of water solutions of compounds that make water conductive can be found in "Solubilities of Inorganic and Metal Organic Compounds" by Seidell, 3rd Edition, 1940, vol. I, D. Van Nostrand Co., New York, pages 557–560.

*Example.*—Assume we have 35,000 kw. of direct current with one terminal at +1500 volts and the other terminal at −1500 volts and we desire to convert the current into 4-wire Y alternating current. In this case I use a rotor 4 feet long and 16 inches in diameter. The electrodes are 5 inches wide by 3 feet long. The inside of the stator is 16.2 inches in diameter. The pressure of the NaOH solution in the stator will be 600 pounds per square inch gauge. The flow of NaOH solution will be 3.2 cubic feet per second. The NaOH solution will be 8% sodium hydroxide dissolved in water. The loss of current as it passes through the NaOH solution will be under 2000 kw. depending on the type of electrical equipment that uses the alternating current produced. The power used to turn the rotor and to pump the NaOH solution will be under 1000 kw. The switch can stand overvoltages caused by lightning of at least 500% and very probably 1000% of its normal rating.

In conclusion I may say that I have disclosed a switch capable of converting direct current to alternating current at a cost of less than a third of prior methods. My switch is particularly adapted to converting direct current of the voltages usually produced by power plants operating on the magnetohydrodynamic principle. However my switch may also be used for other switching jobs such as the conversion of alternating current to direct current.

I claim:
1. A switch comprising: an outer hollow cylindrical shell with an electrode on its inner surface, a cylindrical inner rotor with an electrode on its outer surface, an electrically conducting water solution with means to circulate it between said inner rotor and said outer cylindrical shell in such an amount and under such a pressure to substantially dissolve all the gases produced by electrolysis at the electrodes, means to rotate said inner rotor so that the electrode on the inner rotor continuously alternately approaches and alternately draws away from the electrode on the outer cylinder, said approaching producing the effect of closing a switch and said drawing away producing the effect of opening a switch.

2. A claim according to claim 1 in which the electrically conducting water solution is a solution of a base.

3. A claim according to claim 2 in which the switch is used to convert from direct current into alternating current the electricity produced by a power plant converting heat into electricity by magnetohydrodynamics.

References Cited

UNITED STATES PATENTS

| | | | |
|---|---|---|---|
| 2,140,343 | 12/1938 | Wangemann | 200—32 |
| 2,145,468 | 1/1939 | Wangemann | 200—152 |
| 2,929,104 | 3/1960 | Bohm | 321—50 |

JOHN F. COUCH, *Primary Examiner.*

G. GOLDBERG, *Assistant Examiner.*

U.S. Cl. X.R.

200—152.10